(12) United States Patent
Zurhove

(10) Patent No.: US 9,028,248 B2
(45) Date of Patent: May 12, 2015

(54) METHOD AND INSTALLATION FOR PRODUCING CLINKER

(75) Inventor: Franz-Josef Zurhove, Waldshut-Tiengen (DE)

(73) Assignee: ELEX CemCat AG (CH)

( * ) Notice: Subject to any disclaimer, the term of this patent is extended or adjusted under 35 U.S.C. 154(b) by 0 days.

(21) Appl. No.: 13/984,057

(22) PCT Filed: Feb. 6, 2012

(86) PCT No.: PCT/EP2012/051968
§ 371 (c)(1),
(2), (4) Date: Aug. 7, 2013

(87) PCT Pub. No.: WO2012/107404
PCT Pub. Date: Aug. 16, 2012

(65) Prior Publication Data
US 2013/0312640 A1 Nov. 28, 2013

(30) Foreign Application Priority Data
Feb. 8, 2011 (DE) .......................... 10 2011 000 564

(51) Int. Cl.
| | | |
|---|---|---|
| F27B 15/16 | (2006.01) | |
| C04B 7/36 | (2006.01) | |
| B01D 53/64 | (2006.01) | |
| F27D 17/00 | (2006.01) | |

(Continued)

(52) U.S. Cl.
CPC .............. *C04B 7/364* (2013.01); *B01D 53/64* (2013.01); *B01D 53/8631* (2013.01); *B01D 2253/102* (2013.01); *B01D 2257/602* (2013.01); *B01D 2258/0233* (2013.01); *C04B 7/365* (2013.01); *F27B 7/20* (2013.01); *F27D 17/008* (2013.01)

(58) Field of Classification Search
CPC ...................................................... C04B 7/364
USPC ........ 432/14, 58; 95/41, 57, 68, 70, 134, 273; 96/134
See application file for complete search history.

(56) References Cited

U.S. PATENT DOCUMENTS 5,169,611 A * 12/1992 Kupper et al. ................ 423/210
5,219,544 A * 6/1993 Kupper et al. ............. 423/239.1

(Continued)

FOREIGN PATENT DOCUMENTS

| DE | 102010004011 B3 | 6/2011 |
| EP | 0461305 B1 | 9/1994 |
| EP | 1386655 | 2/2004 |

*Primary Examiner* — Gregory A Wilson
(74) *Attorney, Agent, or Firm* — Renner Kenner Greive Bobak Taylor & Weber

(57) ABSTRACT

The invention relates to a process and a plant for producing cement clinker, which has a furnace system and has essentially the following process steps:—raw material is preheated in a preheater by means of hot offgases from the furnace system,—dust is removed from the hot offgas downstream of the preheater in a preliminary dust removal apparatus to a residual dust concentration of max. 20 g/standard m$^3$,—the offgas which has been subjected to preliminary dust removal is purified in a selective catalytic flue gas purification plant (selective catalytic reduction, SCR),—at least part of the offgas purified in the flue gas purification plant is conveyed in a bypass around a raw material milling plant to a cooling device and cooled there to temperatures of max. 140° C.,—before the residual dust in the offgas is precipitated in a process filter and—at least part of the residual dust precipitated in the process filter is discharged for removal of mercury.

10 Claims, 2 Drawing Sheets

(51) Int. Cl.
  *B01D 53/86* (2006.01)
  *F27B 7/20* (2006.01)

(56) References Cited

U.S. PATENT DOCUMENTS

| | | | | |
|---|---|---|---|---|
| 5,264,013 A | * | 11/1993 | Brentrup | 95/128 |
| 5,505,766 A | | 4/1996 | Chang | |
| 5,575,982 A | * | 11/1996 | Reiss et al. | 423/210 |
| 5,614,016 A | * | 3/1997 | Hundebøl | 106/745 |
| 7,141,091 B2 | | 11/2006 | Chang | |
| 8,133,303 B2 | * | 3/2012 | Schwab et al. | 95/107 |
| 8,470,273 B2 | * | 6/2013 | Saito et al. | 423/210 |
| 8,728,207 B2 | * | 5/2014 | Schulz et al. | 95/134 |
| 8,765,066 B2 | * | 7/2014 | Saito et al. | 422/169 |
| 2010/0300864 A1 | | 12/2010 | Jepsen et al. | |

* cited by examiner

METHOD AND INSTALLATION FOR PRODUCING CLINKER

FIELD OF THE INVENTION

The invention relates to a method and an installation for producing cement clinker.

BACKGROUND OF THE INVENTION

During cement clinker production, mercury is emitted into the environment, primarily in the gaseous state. Elemental mercury and mercury (II) chloride are the dominant species. The latter is water-soluble and becomes highly concentrated in foodstuffs, in particular in fish. It is then absorbed by humans via food. Owing to its high level of toxicity, considerable health risks are connected therewith. The regulatory authorities therefore impose on cement manufacturers increasingly strict threshold values for the permissible emissions. The permissible emission threshold values are also decreasing for other materials which are harmful to humans or the environment, such as dioxins (PCDD), furans (PCDF), long-chained hydrocarbon compounds (VOC) and nitrogen oxides ($NO_x$).

A known method for reducing mercury emissions is described in U.S. Pat. No. 5,505,766 A1 and known under the name TOXECON. In this instance, a highly porous particulate adsorbent (which is referred to as activated carbon below) which comprises primarily carbon is injected at a low concentration into an exhaust gas flow which contains mercury. The mercury is deposited on the activated carbon particles and is then separated in a filter. In the production process for cement, it is disadvantageous for the exhaust gas flow to also contain exhaust gas dust from the combustion or grinding process, which dust is composed primarily of calcium, iron, aluminium and silicon dioxides or carbonates and has a mass flow which is several orders of magnitude greater than the adsorbent. The adsorbent is therefore injected downstream of the process filter of a generally known cement production installation and requires an additional filter for separation. However, this filter is very large, requires high investment costs, requires an additional induced draught fan with the energy consumption connected therewith and seldom has the space required for installation in existing plants.

An improvement of this method is described in U.S. Pat. No. 7,141,091 B2 and known under the name TOXECON II. In this instance, the adsorbent is injected between a filter portion which is located upstream and a filter portion which is located downstream. The dust separated in the filter portion located upstream is not contaminated with the adsorbent, whilst in the filter portion located downstream the residual dust is mixed with adsorbent. No additional filter is required in this method. It is disadvantageous that there is still a large disparity between the mass flows of adsorbent with respect to process dust and this process also does not achieve the efficiency of the TOXECON method.

The dust which occurs in both methods must either be disposed of or can be added as a filler to the cement grinding operation. Since it contains carbon, however, this addition is limited. It is particularly serious that, even with very small proportions, a black colour influence of the activated carbon can be seen.

EP 1 386 655 A1 discloses the addition of bromine or bromine-containing compounds. With the bromine, the elemental mercury forms mercury bromide which can be more readily separated than the elemental form. A disadvantage in the production of cement clinker is the addition of a halogen, which forms circuits between the coarse mill or filter and the preheater and is thereby further enriched, and has disadvantageous effects in the production process. The dust which is contaminated with mercury bromide must be flushed out and subsequently processed or disposed of.

There is known from the subsequently published DE 10 2010 004011 B3 a method and an installation for producing cement clinker and for separating nitrogen oxides and mercury from the exhaust gases of the cement production process, the hot preheater gases being reduced in terms of dust content prior to a selective catalytic exhaust gas cleaning operation. During direct operation, the exhaust gas is then supplied via a cooling tower to a dust filter, before the denitrided and dedusted exhaust gas is directed into a mercury washer or an absorber.

EP 0 461 305 B1 describes a method for cleaning the exhaust gases of installations for producing cement clinker, the exhaust gases of a preheating zone being cleaned in a multi-step filter zone by a separation of dust first being carried out in a first filter step and the exhaust gas subsequently flowing through at least one additional filter step, which is constructed as an adsorption step and which contains an adsorbent by means of which $NH_x$ compounds, heavy metals, trace elements and/or $SO_2$ contained in the exhaust gas are bound and $NO_x$ is at least partially reduced. The exhaust gases of the preheating zone are adjusted prior to the first filter stage to such a filter zone input temperature that, in the first filter step, highly volatile toxic substance elements and toxic substance compounds are separated from the exhaust gases together with the dust.

SUMMARY OF THE INVENTION

An object of the invention is therefore to provide a method and an installation for producing cement clinker which are characterised by means of reduced mercury emission.

According to the invention, this object is achieved with the features of claim 1 and claim 8.

The method according to the invention for producing cement clinker using a furnace system substantially has the following method steps:
- raw material is preheated in a preheater by means of hot exhaust gases of the furnace system,
- the hot exhaust gas, downstream of the preheater, is dedusted in a preliminary dust removal device to a residual dust concentration of a maximum of 20 g/Nm³,
- the pre-dedusted exhaust gas is cleaned in a selective catalytic flue gas cleaning installation (Selective Catalytic Reduction, SCR),
- at least a portion of the exhaust gas cleaned in the flue gas cleaning installation is supplied to a cooling device, bypassing a raw material grinding installation, and is cooled there to temperatures of a maximum of 140° C., before the residual dust of the exhaust gas is separated in a process filter, and
- at least a portion of the residual dust separated in the process filter is flushed out in order to remove the mercury.

The installation according to the invention for producing cement clinker with the above-described method substantially comprises
- a furnace system for burning raw material,
- a preheater which is operated by means of hot exhaust gases of the furnace system for preheating the raw material, a preliminary dust removal device which is constructed to dedust the hot exhaust gas to a residual dust concentration of a maximum of 20 g/Nm$^3$, a selective catalytic flue gas cleaning installation for cleaning the pre-dedusted exhaust gas, a process filter for separating the residual dust of the exhaust gas, a raw material grinding installation which is arranged between the selective catalytic flue gas cleaning installation and process filter for composite operation, a cooling device which is arranged between the selective catalytic flue gas cleaning installation and the process filter for direct operation and which is constructed for cooling the exhaust gas to a temperature of a maximum of 140° C., and a mercury cleaning device which is connected to the process filter for residual dust which is separated in the process filter.

Owing to the temperature which has been lowered in the cooling device to values of less than 140° C., preferably to values of less than 125° C., or even less than 110° C., the vapour pressure of the mercury species is reduced, whereby the adsorption effect is substantially improved. Currently, cooling towers are in most cases sized in such a manner that protection of the process filter is ensured against overheating. These temperatures are generally above 150° C., in many applications even up to 220° C. and in some applications even higher, which is too high for effective adsorption of the mercury. The adsorption is further improved by the dedusting in the preliminary dust removal device since it thereby not only results in a reduction of the quantity of dust, but the residual dust is also finer than upstream of the preliminary dust removal device. The surface-area-rich proportions of the dust which improve the adsorption are thereby increased.

The dependent claims relate to other configurations of the invention.

According to a preferred embodiment of the invention, for improved mercury adsorption downstream of the cooling device, there is injected into the exhaust gas an additional adsorbent which is separated in the process filter together with the residual dust. Preferred sorbents may include activated carbon, hearth furnace coke, lime, hydrated lime, limestone, filter dust or other materials which are suitable as sorbents owing to their large specific surface-area. The injection of the sorbent and the temperature reduction in the cooling tower to the values mentioned previously are advantageously carried out only during operation without any grinding drying of the raw material (=direct operation).

The sorbent separated in the process filter upstream of the flue is preferably for the most part recirculated and the other smaller portion is removed in order to remove the mercury from the process. The injection of sorbents in order to adsorb mercury, such as, for example, activated carbon or hearth furnace coke, is adequately known. In cement production, however, they have the disadvantage that the filter dust is contaminated by means of carbon and can therefore be added to the subsequent cement production process only in a limited manner, such as, for example, by means of metering during the grinding of the cement in the cement mill. It is further more often disadvantageous that the chemical composition of the filter dust differs substantially from that of the ground raw meal. A flushing of the filter dust in these cases would change the chemical composition of the meal supplied to the furnace, which is a mixture of raw meal and filter dust, and consequently change the chemical composition and mineralogy of the cement clinker.

The quantities of filter dust separated in the process filter are dependent on the installation circuit and the adjusted operating mode. During direct operation, that is, the operating state without use of the exhaust gas for grinding drying in the coarse mill, a furnace emits dust concentrations of typically from 30 to 150 g/Nm$^3$ (m$^3$ in the standard state). This is approximately from 4 to 20% with respect to the quantity of clinker produced. During operation of the coarse mill, so-called composite operation, with pre-separation of the dust downstream of the mill in cyclones, there are approximately 25 g/Nm$^3$, otherwise from 300 to 500 g/Nm$^3$. With the large quantities of gas present, there are consequently large quantities of dust produced. The adsorption of mercury on the sorbent takes place in the entrained flow and on the filter cake, in which the sorbent is in a substantially diluted state, owing to the large quantities of dust from the installation operation. This has a negative effect on the adsorption capacity. A compensation by means of higher metering of the sorbent is linked with increasing costs and significantly increases the carbon content in the filter dust.

The installation of an SCR installation without preliminary dust removal directly downstream of the preheater is also known from EP863790B1 or U.S. Pat. No. 6,156,277. The removal of dust upstream of an SCR catalyser is also known from WO2009089559. The SCR catalyser, with expert construction and sufficient content of halogens in the flue gas, has an oxidising effect on elemental mercury. The advantage of mercury oxidation linked with the SCR catalyser involves the significantly better separation of the oxidised mercury on the sorbent in comparison with the non-oxidised mercury, that is to say, elemental mercury. In the cement process, halogens occur primarily in the form of chlorine so that $HgCl_2$ is primarily formed.

During operation with use of the furnace exhaust gas for grinding drying (composite operation), the mercury is for the most part adsorbed in the mill on the dust. This may be attributed on the one hand to the significant decrease of the gas temperature in the mill and, on the other hand, in the case of the bowl mill crushers generally used in this instance, to the very high charging of the gas with particulates and the powerful and highly turbulent recirculation of the particulate-charged flow in the mill. The temperatures in the mill quickly reach a level of generally less than or equal to 110° C., which very significantly reduces the vapour pressure of the mercury species and thereby promotes the adsorption. The adsorption is not carried out in a uniform manner over the grain size distribution but is instead concentrated in the surface-area-rich finest region. This proportion is particularly poorly separated in the cyclone pre-separation often provided between the mill and process filter. The separation of the remaining finest fractions with the already adsorbed mercury is carried out in the process filter. In this instance, there is further an additional adsorption of mercury which is, however, substantially smaller than that in the coarse mill. During composite operation, owing to the adsorption on the process dust, which has already taken place for the most part in the mill and partially in the filter, the mercury emissions are therefore very much lower than during direct operation without any mill. Consequently, during composite operation, the mercury introduced into the process from the outer side becomes enriched between the furnace system and mill or process filter and is then emitted in an intensified manner during direct operation. The time proportion of the composite operation in terms of the overall operating time is in most cases substantially higher than that of the direct operation and generally fluctuates in the range from 70 to 90%. The method according to the invention makes provision for the sorbent to be injected preferably during direction operation since, during composite operation, on the one hand, the grinding drying already reduces the emissions and the sorbent addition is thereby no longer necessary and, on the other hand, the sorbent would mix with the dust from the grinding drying, with the disadvantageous consequences already described.

The proposed invention prevents the diverse disadvantages set out above. It avoids an additional filter for the addition of sorbent and solves the problem of the significant dilution of the sorbent owing to mixing with the high dust charge from the production process by means of a filter which is arranged upstream of the catalyser (hot dust removal) and which is preferably an electric filter owing to the prevailing temperatures. This filter reduces the dust content to values of less than 20 g/Nm$^3$, preferably to values of less than 7 g/Nm$^3$ or even 2 g/Nm$^3$. On the catalyser, this dust reduction enables finer honeycomb structures and consequently a smaller catalyser volume. Furthermore, the cleaning complexity of the catalyser elements decreases with the dust loading.

With the above-described method and the installation for producing cement clinker, not only the mercury emissions but at the same time the emissions of PCDD/PCDF, VOC and NO$_x$ can also be reduced. In this instance, the equipment already available in the installation is mostly used so that the method and the installation are economically advantageous.

BRIEF DESCRIPTION OF THE DRAWINGS

Other advantages and embodiments of the invention are explained in greater detail below with reference to the drawings and the description.

In the drawings.

DETAILED DESCRIPTION OF THE INVENTION

Figure 1:
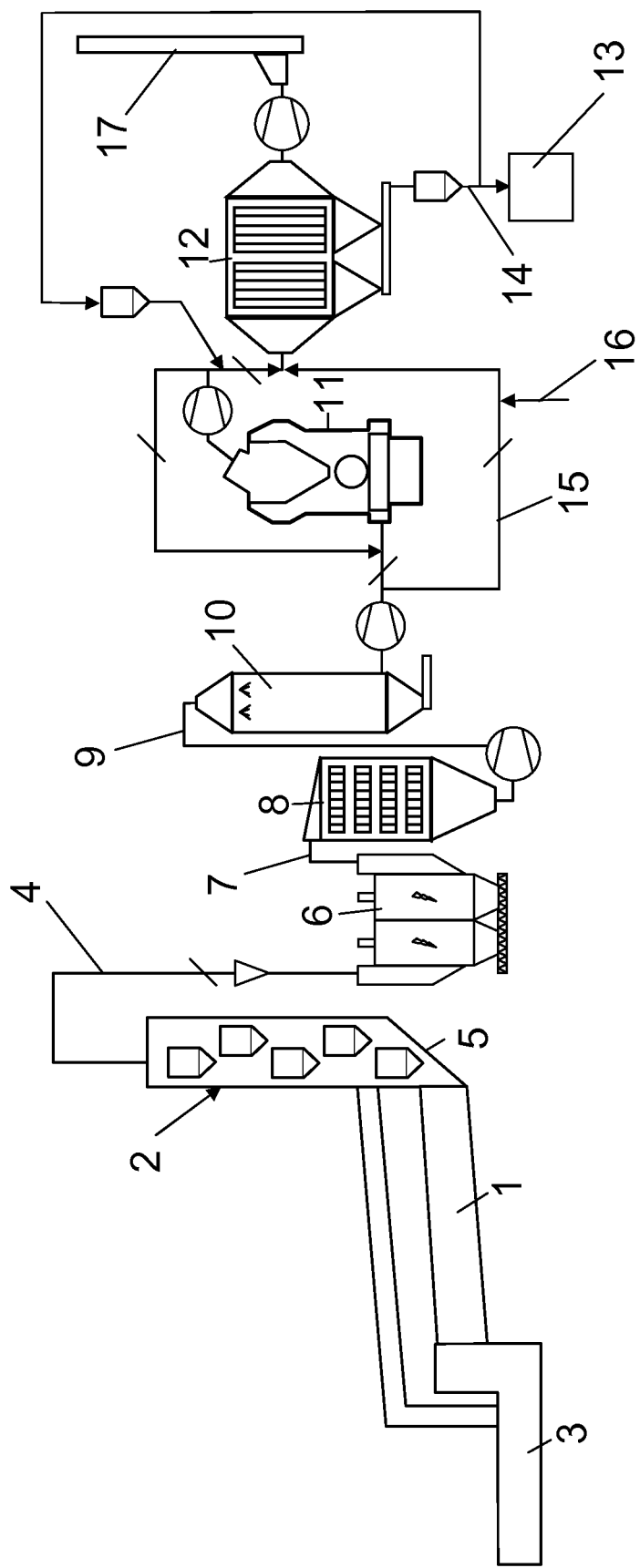
FIG. 1 is a schematic illustration of an installation according to the invention according to a first embodiment.

The installation illustrated in FIG. 1 for producing cement clinker substantially comprises:
- a furnace system 1 for burning raw material 2,
- a cooler 3 for cooling the raw material 2 burnt in the furnace system,
- a preheater 5 which is operated by means of hot exhaust gases of the furnace system 1 for preheating the raw material 2,
- a preliminary dust removal device 6 which is constructed to dedust the hot exhaust gas 4 to a residual dust concentration of a maximum of 20 g/Nm$^3$,
- a selective catalytic flue gas cleaning installation 8 for chemical cleaning of the pre-dedusted exhaust gas 7,
- a process filter 12 for separating the residual dust of the exhaust gas,
- a raw material grinding installation 11 which is arranged between a flue gas cleaning installation 8 and the process filter 12 for composite operation,
- a cooling device 10 which is arranged between the flue gas cleaning installation 8 and process filter 12 for direct operation and which is constructed for cooling the exhaust gas 9 to a temperature of a maximum of 140° C., and
- a mercury cleaning device 13 which is connected to the process filter 12 for residual dust 14 separated in the process filter 12.

The preliminary dust removal device 6 is preferably constructed as an electric filter and is in direct abutment with the preheater 5. The hot exhaust gas 4 is dedusted in the preliminary dust removal device 6 to a residual dust concentration of a maximum of 20 g/Nm$^3$, preferably a maximum of 10 g/Nm$^3$. In some circumstances, dedusting up to a maximum of 5 g/Nm$^3$ is also advantageous.

Subsequently, the dedusted exhaust gas 7 is cleaned in the selective catalytic flue gas cleaning installation (Selective Catalytic Reduction/SCR), the SCR catalyser, in addition to an NO$_x$ reduction, also having an oxidising effect on elemental mercury if a sufficient content of halogens is present in the flue gas. The mercury oxidation brings about significantly better separation of the oxidised mercury on a sorbent in comparison with the non-oxidised mercury, that is to say, elemental mercury.

In installations for the production of cement clinker, a differentiation is made in particular between two operating modes: direct operation, in which the exhaust gas is supplied to the process filter 12, bypassing the raw material grinding installation 11, and composite operation, in which the exhaust gas is directed via the raw material grinding installation 11.

In the embodiment illustrated, the cooling device 10 and the raw material grinding installation 11 are connected in series so that the exhaust gas 9 is also guided during composite operation through the cooling device 10 which is, however, not operational at the time. Generally, water is injected in the cooling device 10 for cooling. This water injection is then switched off during composite operation.

During composite operation, the exhaust gas 9 is thus guided through the cooling device 10 without cooling and reaches the raw material grinding installation 11. The temperatures there quickly reach a level of generally less than or equal to 110° C., which very significantly reduces the vapour pressure of the mercury species and thereby promotes the adsorption. However, the adsorption is not carried out in a uniform manner over the grain size distribution but is instead concentrated in the surface-area-rich finest region. This proportion is separated in a particularly poor manner in the cyclone preliminary separation which is often provided. The separation of the remaining extremely fine fractions with the already adsorbed mercury is carried out in the process filter 12. In this instance, there is further an additional adsorption of mercury which is, however, substantially lower than that in the raw material grinding installation 11.

During direct operation, the exhaust gas 9 is supplied to the process filter 12 via the line 15, bypassing the raw material grinding installation 11. In this instance, the cooling device 10 is switched on in order to cool the exhaust gas 9 to temperatures of a maximum of 140° C., preferably a maximum of 125° C. or even a maximum of 110° C. The cooled exhaust gas is subsequently directed via the line 15 past the raw material grinding installation 11 to the process filter 12. In this operating mode, it is advantageous if an additional adsorbent 16 for improved mercury adsorption after the cooling device 10 is injected into the exhaust gas which is separated in the process filter 12 together with the residual dust 14. The additional adsorbent 16 may, for example, be activated carbon and/or recirculated residual dust 14. The exhaust gas cleaned in the process filter 12 is then discharged into the atmosphere via a flue 17.

Figure 2:
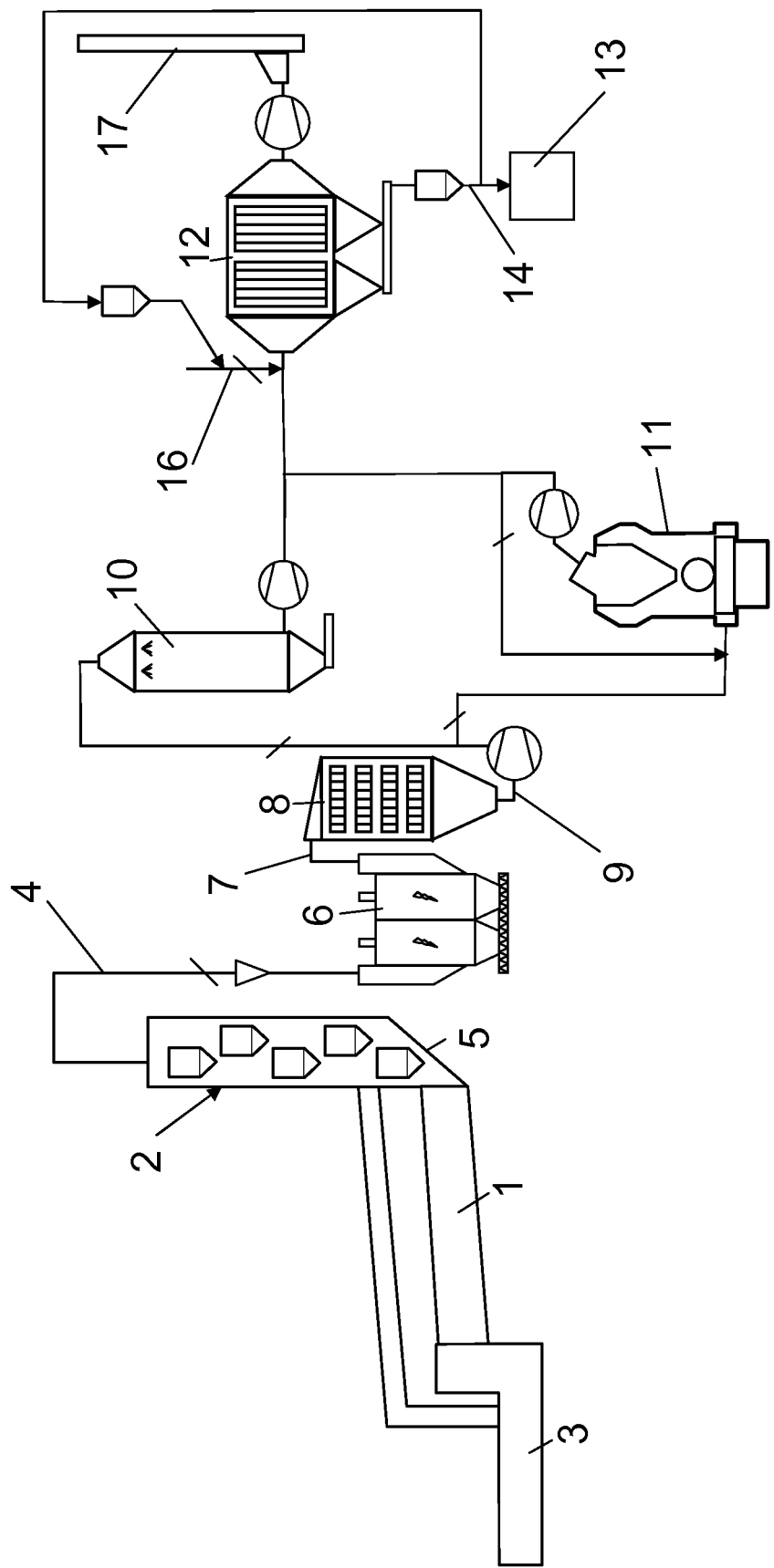
FIG. 2 is a schematic illustration of an installation according to the invention according to a second embodiment.

FIG. 2 shows a second embodiment of the invention, which differs from the variant according to FIG. 1 only owing to a parallel arrangement of the two installation portions, the cooling device 10 and raw material grinding installation 11. In the case of composite operation, the exhaust gases 9 do not first have to be directed through the switched-off cooling device 10, but instead are directed directly to the raw material grinding installation 11. Furthermore, this arrangement also enables mixed operation, in which a portion of the exhaust gas 9 can be used in the raw material grinding installation 11, whilst the remaining portion is guided via the cooling device 10.

Owing to the hot dust removal upstream of the catalytic flue gas cleaning installation 8, the mixing of the sorbent (in the case of activated carbon or the like) is reduced with dust and the sorbent concentration in the process filter 12 is thereby increased. In the preferred embodiment of the process filter 12 acting as a tube filter, an additional adsorption on the filter cake is brought about.

The embodiments described above are distinguished in particular during direct operation by reduced mercury emission.

The invention claimed is:

1. Method for producing cement clinker having a furnace system, wherein
   raw material is preheated in a preheater by means of hot exhaust gases of the furnace system,
   the hot exhaust gas, downstream of the preheater, is dedusted in a preliminary dust removal device to a residual dust concentration of a maximum of 20 g/Nm$^3$,
   the pre-dedusted exhaust gas is cleaned in a selective catalytic flue gas cleaning installation,
   at least a portion of the exhaust gas cleaned in the flue gas cleaning installation is supplied to a cooling device, bypassing a raw material grinding installation,
   before the residual dust of the exhaust gas is separated in a process filter, characterised in that the exhaust gas is cooled in the cooling device to temperatures of a maximum of 140° C. and at least a portion of the residual dust separated in the process filter is flushed out in order to remove the mercury.

2. Method according to claim 1, characterised in that, for improved mercury adsorption downstream of the cooling device, there is injected into the exhaust gas an additional adsorbent which is separated in the process filter together with the residual dust.

3. Method according to claim 1, characterised in that the exhaust gas in the cooling device is reduced to a maximum of 125° C., preferably to a maximum of 110° C.

4. Method according to claim 1, characterised in that the hot exhaust gas downstream of the preheater in the preliminary dust removal device is dedusted to a residual dust concentration of a maximum of 10 g/Nm$^3$, preferably to a maximum of 5 g/Nm$^3$.

5. Method according to claim 1, characterised in that a portion of the residual dust separated in the process filter is recirculated and another portion is flushed out for mercury cleaning.

6. Method according to claim 5, characterised in that at least a portion of the residual dust cleaned in respect of the mercury is recirculated again.

7. Method according to claim 1, characterised in that a remaining portion of the exhaust gas cleaned in the selective catalytic flue gas cleaning installation is supplied to the raw material grinding installation bypassing the cooling device.

8. An apparatus for producing cement clinker with a method wherein:
   raw material is preheated in a preheater by means of hot exhaust gases of the furnace system,
   the hot exhaust gas, downstream of the preheater, is dedusted in a preliminary dust removal device to a residual dust concentration of a maximum of 20 g/Nm$^3$,
   the pre-dedusted exhaust gas is cleaned in a selective catalytic flue gas cleaning installation,
   at least a portion of the exhaust gas cleaned in the flue gas cleaning installation is supplied to a cooling device, bypassing a raw material grinding installation,
   before the residual dust of the exhaust gas is separated in a process filter, characterised in that the exhaust gas is cooled in the cooling device to temperatures of a maximum of 140° C. and at least a portion of the residual dust separated in the process filter is flushed out in order to remove the mercury, the apparatus comprising:
   a furnace system for burning raw material,
   a preheater which is operated by means of hot exhaust gases of the furnace system for preheating the raw material,
   a preliminary dust removal device which is constructed to dedust the hot exhaust gas to a residual dust concentration of a maximum of 20 g/Nm$^3$,
   a selective catalytic flue gas cleaning installation for cleaning the pre-dedusted exhaust gas,
   a process filter for separating the residual dust of the exhaust gas,
   a raw material grinding installation arranged between the flue gas cleaning installation and the process filter for composite operation and
   a cooling device arranged between the flue gas cleaning installation and the process filter for direct operation,
   characterised in that the cooling device is constructed for cooling the exhaust gas to a temperature of a maximum of 140° C. and the process filter is connected to a mercury cleaning device for residual dust which is separated in the process filter.

9. Installation according to claim 8, characterised in that the preliminary dust removal device is formed by an electric filter.

10. Installation according to claim 9, characterised in that the preliminary dust removal device is directly adjacent to the preheater.

* * * * *